United States Patent [19]

Koike

[11] Patent Number: 4,488,753
[45] Date of Patent: Dec. 18, 1984

[54] VEHICLES FOR EFFECTING A SEAL
[75] Inventor: Shyouichi Koike, Sagamihara, Japan
[73] Assignee: Nissan Motor Company, Limited, Yokohama, Japan
[21] Appl. No.: 335,335
[22] Filed: Dec. 29, 1981
[30] Foreign Application Priority Data Dec. 29, 1980 [JP] Japan ............... 55-188369

[51] Int. Cl.³ ............................................. B62D 27/04
[52] U.S. Cl. ...................................... 296/201; 296/73;
296/154; 296/202; 49/485; 52/208; 52/400
[58] Field of Search .................... 296/29, 84 A, 84 D,
296/93, 146 (U.S. only), 154, 194, 200, 201,
216, 218, 202; 49/485; 52/208, 400, 403

[56] References Cited

U.S. PATENT DOCUMENTS

| 3,045,787 | 7/1962 | Attwood | 296/93 |
|---|---|---|---|
| 3,150,421 | 9/1964 | Lickert | 296/93 |
| 3,276,167 | 10/1966 | Bus et al. | 49/485 |
| 3,596,980 | 8/1971 | Cadiou | 296/154 |
| 4,092,813 | 6/1978 | Eggert | 52/403 |
| 4,123,100 | 10/1978 | Ellis | 296/93 |

FOREIGN PATENT DOCUMENTS

| 0132946 | 11/1978 | German Democratic Rep. | 296/154 |
|---|---|---|---|
| 702743 | 12/1951 | United Kingdom . | |
| 806930 | 4/1957 | United Kingdom . | |
| 858573 | 4/1959 | United Kingdom . | |
| 2031499 | 4/1980 | United Kingdom | 296/93 |

Primary Examiner—David A. Scherbel
Assistant Examiner—Dennis H. Pedder
Attorney, Agent, or Firm—Lowe, King, Price & Becker

[57] ABSTRACT

A vehicle body comprises a windshield weatherstrip mounted to a front hinge pillar and extending along and engaged with the lateral end of a windshield glass. A door frame adjacent the front hinge pillar has an outer surface adapted to match the outer surface of the windshield glass and is engageable at the inner surface of the forward end thereof with the windshield weatherstrip. The windshield weatherstrip has an outer surface smoothly extending between the windshield glass and the door frame.

13 Claims, 7 Drawing Figures

VEHICLES FOR EFFECTING A SEAL

BACKGROUND OF THE INVENTION

1. Field of the Invention

The present invention relates in general to vehicle bodies having a front hinge pillar cooperating with a door frame and more particularly, to vehicle body improvements around the front hinge pillar with a view to reducing wind noise resulting when the vehicle is travelling at a high speed.

2. Description of the Prior Art

FIG. 2 shows a prior art front hinge pillar for the part a vehicle body wherein a front hinge pillar is generally designated at 1 and consists of three separate panels, i.e., outer panel 1a and first and second inner panels 1b and 1c. The panels are joined at 1d, 1e and 1f to form a closed configuration. A windshield 2 is bonded by a sealant-adhesive 3 to the joint portion 1d of the front hinge pillar 1. In order to conceal the sealant-adhesive from view, there is provided a windshield molding 4 at the joint between the windshield 2 and the front hinge pillar 1. A drip moulding 5 is secured to the joint portion 1e of the front hinge pillar 1 to form a drip channel 6 as well as to provide a refined appearance.

A door 7 has a door frame 8 cooperating with the front hinge pillar 1, and between this door frame 8 and the first inner panel 1b of the front hinge pillar 1 there is interposed a door weatherstrip 9 for waterproofing the interior of the vehicle. The door 7 further has a raisable or lowerable window 10 and a door window weatherstrip 11. A pillar garnish 12 is attached to the front hinge pillar 1 to provide a refined appearance at the interior of the vehicle.

In the foregoing prior art structure, there are on the exterior of the vehicle body air areas $A_1$, $A_2$ and $A_3$ where air turbulence takes place or low air pressure is produced upon travelling of the vehicle. The air area $A_1$ is located at a vehicle body exterior surface portion where a sudden variation in height between the windshield 2 and the windshield molding 4 exists. The air area $A_2$ is located around the mouth of the drip channel 6, and the air area $A_3$ is located in the gap between the drip molding 5 and the door frame 8. Upon travelling of the vehicle at a high speed, air turbulence taking place at the air areas may cause large wind noise as well as large air resistance.

The above effect of the air area $A_1$ can be substantially eliminated by reducing the foregoing difference in height. In the past, however, such effect of the air areas $A_2$ and $A_3$ could not be substantially reduced without dispensing with the drip channel 6 which is communicated with the drip channel at the side of the roof to discharge rain or water collected thereat. When such drip channel 6 is simply removed, rain or water flows easily over the door window 10 to impair the visibility through the door window.

SUMMARY OF THE INVENTION

In accordance with the present invention, there is provided a vehicle body comprising a front hinge pillar, a windshield having a lateral end bonded to the front hinge pillar, a side door located laterally rearwardly of the front hinge pillar and having a door frame adjacent the front hinge pillar, and a windshield weatherstrip mounted to the front hinge pillar.

The windshield weatherstrip has a T-like cross section including a base portion extending along and engaged with the lateral end of the windshield, a lip portion extending from the base portion to lie over the outer surface of the lateral end of the windshield, and a tongue portion extending from the base portion in the direction opposite to the lip portion and resiliently engageable with the inner surface of the forward end of the door frame.

The door frame has an outer surface which is smoothly curved longitudinally and laterally of the vehicle body in a manner to match the contour of the outer surface of the windshield, and the windshield weatherstrip has an outer surface extending smoothly between the outer surfaces of the windshield and the door frame.

The above structure is quite effective in attaining small drag coefficient as well as small wind noise.

It is accordingly an object of the present invention to provide a novel and improved vehicle body which is free from the foregoing drawbacks inherent in the prior art structure.

It is another object of the present invention to provide a novel and improved vehicle body of the above mentioned character which is enabled to effect small wind noise as well as small air resistance or drag coefficient while permitting the provision of a drain conduit at a location adjacent a front hinge pillar of the vehicle body for discharging rain or water collected at a drip channel at a lateral side of a roof of the vehicle body.

BRIEF DESCRIPTION OF THE DRAWINGS

The features and advantages of the vehicle body according to the present invention will become more clearly appreciated from the following description taken in conjunction with the accompanying drawings, in which.

DESCRIPTION OF THE PREFERRED EMBODIMENTS

Figure 1:
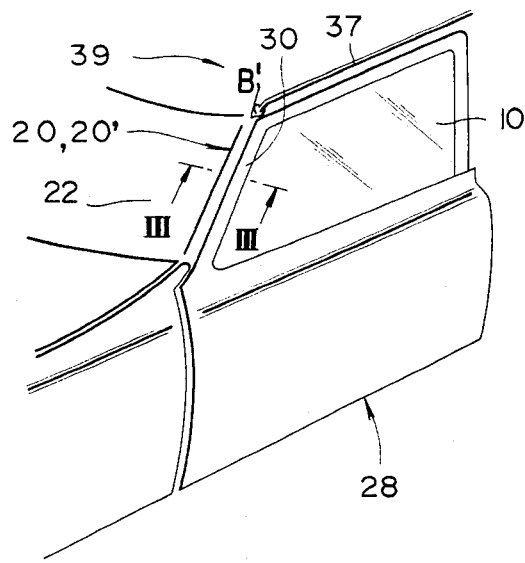
FIG. 1 is a partial perspective view of an automobile.
Figure 2:
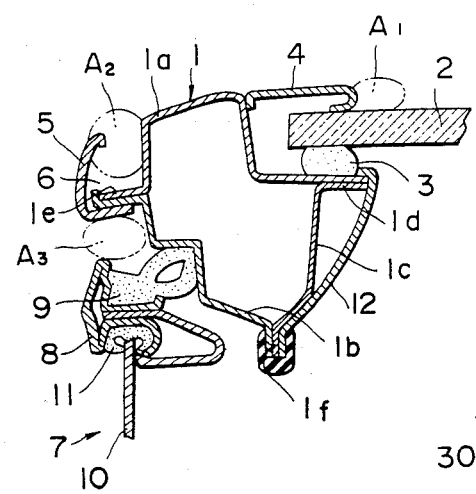
FIG. 2 is a sectional view of a prior art structure for the part of a vehicle body similar to that of FIG. 3.
Figure 3:
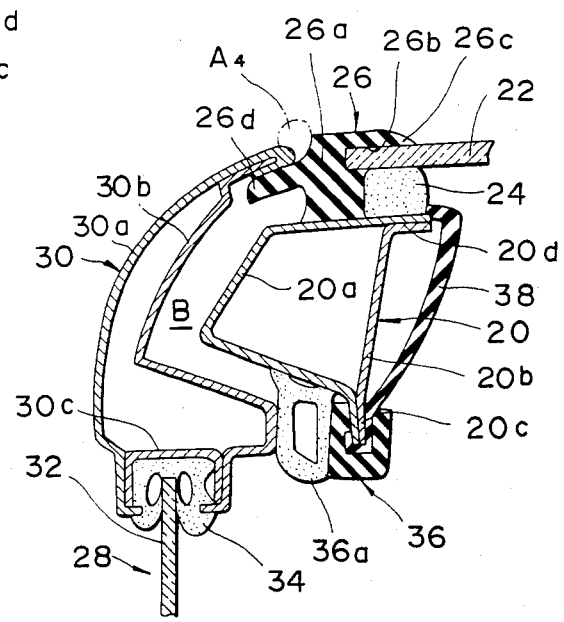
FIG. 3 is a sectional view taken along the line II—II of FIG. 1 and shows an embodiment of the present invention.

Referring to FIGS. 1 and 3 which show an embodiment of the present invention, a front hinge pillar is generally designated at 20 and shown to be composed of an outer panel 20a and an inner panel 20b pinch-welded or otherwise secured together at 20c and 20d to form a closed configuration. A windscreen or windshield 22 is bonded by a sealant-adhesive 24 at each lateral end to the joint portion 20d of the corresponding front hinge pillar 20. The lateral end of the windshield 22 is also fitted in a windshield weatherstrip 26 made of a synthetic resinous material for instance. The windshield weatherstrip 26 has a T-like cross section including a nearly rectangular base portion 26a engaged at the bottom thereof with the outer panel 20a of the front hinge pillar 20 and formed with a slot 26b receiving therein the lateral end of the windshield 22, a lip portion 26c extending from the base portion 26a along the outer surface of the windshield 22 to fittingly engage with same, and a tongue portion 26d extending from the base portion 26a in the opposite direction to the lip portion 26c for sealing engagement with a side door 28 which is located laterally rearwardly of the front hinge pillar 20. The lip portion 26c has a free end which is sharpened or which becomes thinner toward the marginal edge so that the external contour of the vehicle body at the joint between the windshield 22 and the windshield weatherstrip 26 is aerodynamically clean as seen from the drawing for thereby substantially preventing air turbulence at that joint. The side door 28 is shown to comprise a sash or frame 30 adjacent the front hinge pillar 20, a raisable and lowerable glass panel or window 32 and a door window weatherstrip 34. The door frame 30, in particular the forward part thereof is comprised of inner and outer panels 30a and 30b which are rigidly secured together by crimping the marginal edge of the outer panel 30b around the edge of the inner panel 30a in a manner as illustrated in the drawing establishing a forward end of door frame 30. The door frame 30 further has a connecting member 30c of a channel-like cross section which interconnects the rearward marginal edges of the inner and outer panels 30a and 30b. The connecting member 30c is also adapted to receive therewithin the door window weatherstrip 34 for providing a seal between the door window 32 and the door frame 30 as well as for guiding upward and downward movements of the door window 32.

The foregoing tongue portion 26d of the windshield weatherstrip 26 is sealingly engageable with the inner surface of the front marginal or forward end of the door frame 30 to provide a seal between the front hinge pillar 20 and the door frame 30 when the door 28 is closed. As will be seen from the drawing, the door frame outer panel 30a is smoothly curved in a manner to match the contour of the outer surface of the windshield 22, i.e., the door frame 30 has an outer surface which is smoothly curved longitudinally and laterally of the vehicle body in a manner to match the contour of the outer surface of the windshield 22. Further, as is seen from FIG. 3, the forward end of frame 30 overlies a front end (i.e., a part of panel 20a that faces forwardly) of pillar 20 that extends generally parallel to the lateral edge of windshield 22.

A door weatherstrip 36 is fitted to the joint portion 20c of the front hinge pillar 20 and has an integral sealing lip 36a which is resiliently engageable with both the door frame inner panel 30b and the front hinge pillar outer panel 20a to waterproof the interior of the vehicle when the door 28 is closed. A pillar garnish 38 is fitted to the front hinge pillar 20 in the conventional manner.

As will be seen from the drawing, the door frame 30, windshield weatherstrip 26, front hinge pillar 20 and door weatherstrip 36 cooperate with each other to define a path or chamber B which serves as a drain conduit for carrying away rain or water from a drip channel 37 through an upper opening B' (refer to FIG. 1) at a lateral side of a roof 39 and discharging it therethrough.

By the foregoing, it is to be noted that the part of the vehicle body around the front hinge pillar 20 is contoured to be aerodynamically clean to prevent air turbulence and therefore wind noise thereat. That is, the contour of the outer surface of the door frame outer panel 30a is adapted to match the contour of the outer surface of the windshield 22, and furthermore the outer surface of the windshield weatherstrip 26 is adapted to somewhat smoothly interconnect the outer surfaces of the windshield 22 and the door frame outer panel 30a.

With the foregoing structure, upon travelling of the vehicle, air turbulence is hardly caused in the air stream flowing from the windshield 22 via the lip portion 26c and the base portion 26a of the windshield weatherstrip 26 to the door frame outer panel 30a, so that wind noise is hardly caused at that part of the vehicle body and even if caused, it will be negligibly small. The vehicle body of this invention is desirable for reducing air resistance or drag coefficient as well as wind noise.

In FIG. 3, the reference character $A_4$ indicates an air area at the joint between the windshield weatherstrip 26 and the door frame 30a. Due to this air area $A_4$, a little wind noise may be caused thereat but will be small as mentioned above. In this connection, it is to be noted that the windshield weatherstrip 26 is sealingly engaged at its tongue portion 26d with the forward end of the door frame 30a. Due to this structure, the wind noise at the air area $A_4$ is effectively prevented from being transmitted to the air in the chamber B. Only a little wind noise is therefore transmitted to the door weatherstrip 36 to be damped out or absorbed thereby. In this manner, the wind noise resulting at the air area $A_4$ is substantially prevented from being transmitted to the interior of the vehicle.

Figure 4:
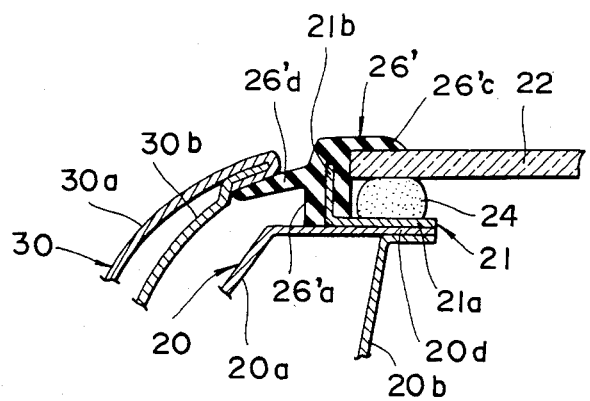
FIGS. 4 to 7 are sectional views similar to FIG. 3, though some elements are omitted, and show modified embodiments according to the present invention.

Referring to FIG. 4 in which some parts and portions similar to those in the previous embodiment are omitted, the second embodiment of the present invention is substantially similar to the previous embodiment except that the windshield weatherstrip 26' is fitted to an outwardly projecting flange portion of the front hinge pillar 20. That is, the front hinge pillar 20 is provided with a support member 21 which has a L-like cross section including a first leg 21a secured to the outer panel 20a of the front hinge pillar 20 at and adjacent the joint portion 20d and second leg 21b projecting outwardly of the pillar. To this second leg 21b of the support member 21, the base section 26'a of the windshield weatherstrip 26' is fitted and secured. This embodiment of FIG. 4 can produce substantially the same effect as the previous embodiment of FIG. 3.

Figure 5:
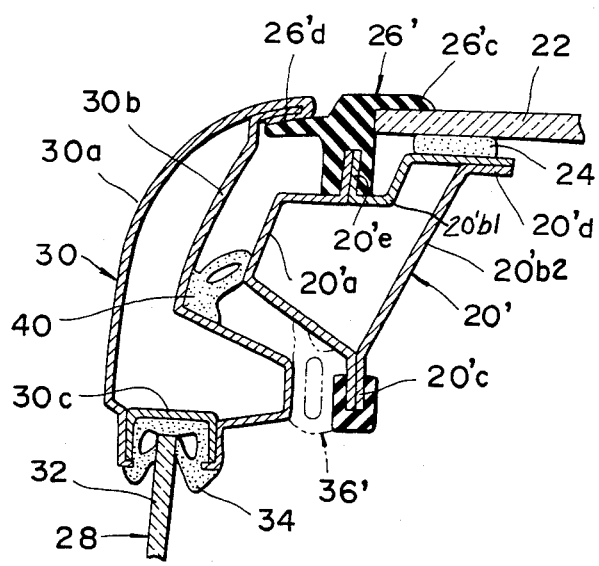

FIG. 5 shows the third embodiment of the present invention. In this embodiment, the front hinge pillar 20' is of the kind composed of three panels, i.e., outer panel 20'a and first and second inner panels 20'$b_1$ and 20'$b_2$. The three panels are joined at 20'c, 20'd and 20'e to form a closed configuration. The windshield glass 22 is bonded by a sealant-adhesive 24 to the first inner panel 20'$b_1$ of the front hinge pillar 20' at the joint between the second inner panel 20'$b_2$ and the first inner panel 20'$b_1$. The outer panel 20'a and first inner panel 20'$b_1$ have mating flanges which are joined at the joint portion 20'e to provide the front hinge pillar 20' with an outwardly projecting flange portion 20'e to which the windshield weatherstrip 26' is fitted and secured. A door weatherstrip 40 is mounted to the door frame inner panel 30b at the bent portion intermediate between the opposed marginal edges of the door frame in a manner to resiliently engage the outer panel 20'a of the front hinge pillar 20' for thereby waterproofing the interior of the vehicle when the door 28 is put into its closed position. In addition to this door weatherstrip 40, a door weatherstrip 36' illustrated by the two-dot chain lines in the drawing may be provided in a manner similar to the embodiment of FIG. 3. In that case, there is provided a so-called triple-seal between the front hinge pillar 20' and the door frame 30. This embodiment is substantially similar to the embodiment of FIG. 3 except for the above-mentioned structure and can effect substantially the same effect as the embodiment of FIG. 3.

Figure 6:
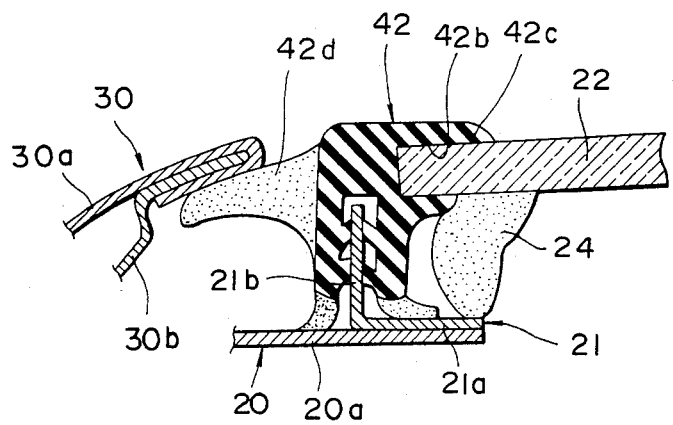

FIG. 6 is a view similar to FIG. 4 but shows the fourth embodiment of the present invention. In this embodiment, a windshield weatherstrip 42 is used which differs from those in the previous embodiments. That is while the windshield weatherstrip 42 is fitted at the base portion 42a to the outwardly projecting leg 21b of the support member 21 similarly to the embodiment of FIG. 4, the base portion 42a is formed with a plurality of interior sealing fingers 42e resiliently engaging the leg 21b. The base portion 42a of the windshield weatherstrip 42 is also formed at the bottom thereof with a pair of bottom sealing fingers 42f and 42g resiliently engaging the outer panel 20a of the front hinge pillar 20 and the first leg 21a of the support member 21. The windshield weatherstrip 42 has a groove 42b receiving therein the lateral end of the windshield 22 and also has a lip portion 42c and a tongue portion 42d which are substantially similar in shape and basic function to the lip portion 26'c and tongue portion 26'd of the windshield weatherstrip 26' of FIG. 4. However, the tongue portion 42d and the pair of bottom sealing fingers 42f and 42g are formed from a material different from that of the remaining part of the weatherstrip. That is, the tongue portion and barrier lips are formed from a relatively soft, sufficient resilient material such as rubber or synthetic resinous material so that the tongue portion 42d is enabled to attain an improved seal between the weatherstrip 42 and the door frame 30a whilst the bottom sealing fingers 42f and 42g is enabled to attain an improved seal between the weatherstrip 42 and the front hinge pillar 20 as well as to softly contact the front hinge pillar 20 so as not to damage the paint coating thereof. The remaining part of the weatherstrip 42 including the other part of the base portion 42a and the lip portion 42c is formed from a harder and resiliently stiffer material than that forming the tongue portion 42d and the bottom sealing fingers 42f and 42g, a synthetic resinous material for instance. The weatherstrip 42 formed from two different materials into a single-piece can be attained by a known particular extrusion process in which two different materials are extruded at the same time. This embodiment is substantially similar to the embodiment of FIG. 4 except for the above mentioned structure and can effect substantially the same effect as the embodiment of FIG. 4.

Figure 7:
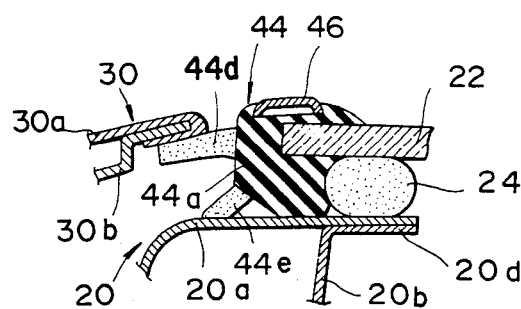

FIG. 7 shows the fifth embodiment which is a modification of the embodiment of FIG. 3. In this embodiment, a windshield weatherstrip 44 is used which differs from the weatherstrip 26 in FIG. 3 in that its base portion 44a is provided with a bottom sealing finger 44e and further in that the bottom sealing finger 44e and tongue portion 44d are formed from a material different from that forming the other part of the base portion 44a in the way similar to the embodiment of FIG. 6. In the weatherstrip 44 there is fitted a windshield molding 46 having a lustrous external surface in order to attain a further refined appearance. This embodiment can produce substantially the same effect as the embodiment of FIG. 3.

Obviously, many variations and modifications of the present invention are possible in light of the above teachings. It is, therefore, to be understood that within the scope of the appended claims, the invention may be practiced otherwise than as specifically described.

What is claimed is:

1. A vehicle body, comprising:
   a front hinge pillar;
   a windshield having a lateral edge portion bonded to said front hinge pillar;
   a side door having a door frame formed from panel members located adjacent said front hinge pillar; and
   a windshield weatherstrip mounted to said front hinge pillar, said weatherstrip being T-shaped in cross section and including a base portion extending to engage the front hinge pillar and the lateral edge portion of said windshield, a lip portion extending from said base portion to contact and overlie the outer surface of the lateral edge portion of said windshield, said lip portion having an outer surface tapered toward said windshield to terminate in a pointed end on the windshield so that transition from the outer surface of the windshield to the outer surface of the windshield weatherstrip is smooth and uninterrupted to obtain laminar air flow at the point of contact between and about the windshield and weatherstrip, said weatherstrip further having a tongue portion extending from said base portion in a direction opposite said lip portion;
   the door frame panel members having a forward end portion overlying a front end of said front hinge pillar where the windshield weatherstrip base portion is mounted, the forward end portion of the door frame panel members being engaged at an inner surface thereof with said tongue portion of said windshield weatherstrip; said door frame also having an outer surface being smoothly curved to extend forwardly and laterally inward toward the windshield to generally form a continuation of the outer surface of the windshield; and
   said windshield weatherstrip having an outer surface extending generally smoothly over a substantial portion thereof between the outer surfaces of said windshield and said door frame.

2. A vehicle body as set forth in claim 1, wherein said windshield weatherstrip is formed at the base portion thereof with a groove receiving the lateral edge portion of said windshield.

3. A vehicle body as set forth in claim 1, wherein said front hinge pillar has an outwardly projecting flange portion, and wherein said base portion of said windshield weatherstrip is fitted to said flange portion.

4. A vehicle body as set forth in claim 3, wherein said flange portion includes an L-shaped support member secured to a panel member forming said front hinge pillar.

5. A vehicle body as set forth in claim 3, wherein said flange portion is formed from a pair of mating flanges of two panel members forming said front hinge pillar.

6. A vehicle body as set forth in claim 1, wherein said windshield weatherstrip is an extended member of unitary construction formed from two different materials wherein said tongue portion and part of said base portion are formed from a soft and sufficiently resilient material while said lip portion and the remaining part of said base portion are formed from a harder and resilient stiffer material than that forming said tongue portion and said part of said base portion.

7. A vehicle body as set forth in claim 6, wherein said base portion of said windshield weatherstrip includes a pair of bottom sealing fingers formed from said soft and sufficiently resilient material to resiliently engage said front hinge pillar.

8. A vehicle body as set forth in claim 6, wherein said base portion of said windshield weatherstrip is formed with a single bottom sealing finger formed from said soft and sufficiently resilient material to resiliently engage said front hinge pillar.

9. A vehicle body as set forth in claim 4, wherein said base portion of said windshield weatherstrip is formed with a plurality of interior sealing fingers resiliently engaging said flange portion of said front hinge pillar.

10. A vehicle body as set forth in claim 8, wherein said windshield weatherstrip is fitted with a windshield molding having a lustrous external surface.

11. A vehicle body as set forth in claim 1, further comprising a door weatherstrip mounted to said front hinge pillar to engage said door frame to provide a seal between said front hinge pillar and said door frame and form an interior chamber surrounded and defined by said windshield weatherstrip, said door frame, said door weatherstrip and said front hinge pillar.

12. A vehicle body as set forth in claim 11, further comprising a roof and a drip channel located at a lateral side of said roof, and wherein said chamber communicates with said drip channel to discharge rain or water within said drip channel.

13. The vehicle body of claim 1, wherein the forward end portion of the door frame panel members overlie a forwardly facing front end of said front hinge pillar extending generally parallel to the lateral edge portion of the windshield.

* * * * *